US006892840B2

(12) United States Patent
Meaney, Jr.

(10) Patent No.: US 6,892,840 B2
(45) Date of Patent: May 17, 2005

(54) HYBRID ELECTRIC VEHICLE HAVING ALTERNATE POWER SOURCES

(76) Inventor: Daniel J. Meaney, Jr., P.O. Box 22307, Santa Barbara, CA (US) 93121

( * ) Notice: Subject to any disclaimer, the term of this patent is extended or adjusted under 35 U.S.C. 154(b) by 0 days.

(21) Appl. No.: 10/393,854

(22) Filed: Mar. 21, 2003

(65) Prior Publication Data

US 2003/0183429 A1 Oct. 2, 2003

Related U.S. Application Data

(63) Continuation-in-part of application No. 09/305,912, filed on May 5, 1999, now Pat. No. 6,536,547.

(51) Int. Cl.[7] .............................. B60K 6/00; B60K 1/00; F02B 43/08
(52) U.S. Cl. ............. 180/65.2; 180/65.3; 123/DIG. 12; 123/3
(58) Field of Search ................................ 180/65.1, 65.2, 180/65.3, 65.4, 65.6; 123/DIG. 12, DIG. 13

(56) References Cited

U.S. PATENT DOCUMENTS

| 4,099,589 A | 7/1978 | Williams ................... 180/65 A |
| 4,112,875 A | 9/1978 | Laumann et al. .............. 123/1 |
| 4,182,960 A | 1/1980 | Reuyl .......................... 290/1 R |

(Continued)

FOREIGN PATENT DOCUMENTS

| CH | 0688202 A5 | 6/1997 | ................ 180/65.2 |
| GB | 2345729 A | 7/2000 | ................ 180/65.2 |
| WO | WO9108122 | 6/1997 | ................ 180/65.2 |

OTHER PUBLICATIONS

Article entitled *To Define Future Car, GM, Toyota Says Bigger is Better*, One (1) page; The Wall Street Journal, Apr. 20, 1999.
*The Electrochemical Engine for Vehicles*, by A. John Appleby, pp. 74 through 79, Scientific American, Jul., 1999.
Declaration of Daniel J. Meaney, Jr. Under 37 CFR Section 1.132 with Exhibits 1 through 8, Dated Jul. 16, 2002, 43 pages, File Wrapper of U.S Pat. No. 6,536,547 issued Mar. 25, 2003.

*Primary Examiner*—Christopher P. Ellis
*Assistant Examiner*—M B Klebe
(74) *Attorney, Agent, or Firm*—Daniel J. Meaney, Jr.

(57) ABSTRACT

A hybrid electric vehicle having alternate fuel sources is shown. The hybrid vehicle includes an AC/DC converter for storing a direct current voltage in a storage device such as a battery. A fuel converter converts a composition combustible fuel into a combustible fuel preferably hydrogen. The combustible material is stored in a combustible fuel storage device. The charging of a battery and the storage of the combustible fuel occur at prior to the starting of or the operation of the hybrid electric vehicle. A driving system includes a direct current motor and a combustible fuel engine. A control device enables the driving system to be powered by the direct current voltage or the combustible fuel. Preferably the combustible fuel is hydrogen. A hydrogen fuel cell is responsive to hydrogen to produce a direct current voltage for charging a battery or driving the direct current motor.

34 Claims, 3 Drawing Sheets

U.S. PATENT DOCUMENTS

| | | | | |
|---|---|---|---|---|
| 4,578,955 A | * | 4/1986 | Medina | 60/709 |
| 5,193,635 A | * | 3/1993 | Mizuno et al. | 180/65.3 |
| 5,318,142 A | * | 6/1994 | Bates et al. | 180/65.2 |
| 5,343,970 A | | 9/1994 | Severinsky | 180/65.2 |
| 5,346,031 A | * | 9/1994 | Gardner | 180/179 |
| 5,399,251 A | | 3/1995 | Nakamats | 204/262 |
| 5,401,589 A | | 3/1995 | Palmer et al. | 429/13 |
| 5,409,784 A | * | 4/1995 | Bromberg et al. | 429/13 |
| 5,413,075 A | * | 5/1995 | Mamiya et al. | 123/431 |
| 5,437,250 A | * | 8/1995 | Rabinovich et al. | 123/3 |
| 5,656,916 A | | 8/1997 | Hotta | 320/22 |
| 5,670,830 A | | 9/1997 | Koga et al. | 307/10.1 |
| 5,695,893 A | | 12/1997 | Arai et al. | 429/221 |
| 5,780,980 A | | 7/1998 | Naito | 318/139 |
| 5,785,136 A | | 7/1998 | Falkenmayer et al. | 180/65.2 |
| 5,820,172 A | | 10/1998 | Brigham et al. | 290/40 C |
| 5,842,534 A | | 12/1998 | Frank | 180/65.2 |
| 5,875,691 A | | 3/1999 | Hata et al. | 74/661 |
| 5,908,077 A | * | 6/1999 | Moore | 180/65.2 |
| 5,982,139 A | * | 11/1999 | Parise | 320/109 |
| 6,044,922 A | | 4/2000 | Field | 180/65.2 |
| 6,054,838 A | | 4/2000 | Tsatsis | 320/101 |
| 6,081,042 A | | 6/2000 | Tabata et al. | 290/45 |
| 6,378,637 B1 | * | 4/2002 | Ono et al. | 180/65.3 |
| 6,408,966 B1 | * | 6/2002 | Benz et al. | 180/65.1 |
| 6,447,939 B1 | * | 9/2002 | Iwasaki | 429/9 |
| 6,615,940 B2 | * | 9/2003 | Morisawa | 180/65.1 |

\* cited by examiner

HYBRID ELECTRIC VEHICLE HAVING ALTERNATE POWER SOURCES

CROSS-REFERENCES TO RELATED APPLICATIONS

This Application is a Continuation-in-Part of U.S. patent application Ser. No. 09/305,912 filed May 5, 1999, which issued as U.S. Pat. No. 6,536,547 on Mar. 25, 2003.

STATEMENT REGARDING FEDERALLY SPONSORED RESEARCH OR DEVELOPMENT

Not Applicable

REFERENCE TO A "MICROFICHE APPENDIX" (SEE 37 CFR 1.96)

Not Applicable

BACKGROUND OF THE INVENTION

1. Field of the Invention

This invention relates to a motor vehicle having alternate power sources including a direct current voltage storage device and a combustible fuel storage device and more particularly relates to a hybrid electric vehicle having separate storage devices for a combustible fuel produced by a fuel converter from a composition combustible fuel and for direct current voltage and wherein a control device that is operatively connected to a direct current motor and to a combustible material fuel engine, or an internal combustion engine or a combustible fuel engine (referred to collectively herein as a "combustible fuel engine"), selectively applies a first control signal to the direct current motor or a second control signal to a combustible fuel engine to enable a driving system comprising a vehicle drive motor and driving train driving the hybrid electric vehicle to be powered or driven by the direct current voltage or a combustible fuel engine powered by the combustible material or combustible fuel (referred to collectively herein as a "combustible fuel") generated from a composition combustible fuel or the composition combustible fuel.

2. Description of the Prior Art

Hybrid electric vehicles powered by direct current motors using batteries as energy devices and internal combustion engines powered by gasoline are well known in the prior art. Examples of electric vehicles are disclosed in U.S. Pat. Nos. 5,343,970 and 4,099,589. U.S. Pat. No. 5,343,970 discloses a hybrid electric vehicle and U.S. Pat. No. 4,099,589. discloses an electric car, each of which have a gasoline powered internal combustion gasoline engine and an electric motor which is powered by direct current stored in batteries.

U.S. Pat. No. 5,875,691 discloses a hybrid drive system for outputting the power of an internal combustion engine and the power of a motor generator through a transmission to drive the vehicle.

Numerous methods have been proposed to manage the stored electrical power in hybrid vehicle to improve both operating performance and driving range. For example, U.S. Pat. No. 5,820,172 discloses an operating strategy for a hybrid electric vehicle that manages the flow of energy to both supply the motive demand power of the hybrid electric vehicle and to maintain the charge of the energy storage system.

U.S. Pat. No. 5,780,980 discloses an electric car drive system having a car drive motor powered by a mounted direct current power supply and a control system including a signal generating means to generate signals which control motor speed. The direct current power supply is composed of a power battery having secondary cells connected to the motor and an energy battery formed by fuel cells connected in parallel to the power battery via an energy battery control switch. The electric vehicle includes a charge control means to keep the charge on the power battery using the energy batteries if charge of the power battery is below a specified value.

Motor vehicles having alternate source of power other than batteries for powering a motor vehicle are known in the art. For example, U.S. Pat. No. 5,399,251 discloses a system for generating hydrogen and oxygen using water in a tank having a solid polyelectric film which separates the tank into operating sections and uses electrodes for generating hydrogen. The power generating system is a separate power source and generates a second combustible fuel which is mixed together with gasoline as a first composition combustible fuel to power a motor vehicle using an internal combustion engine.

U.S. Pat. No. 5,785,136 discloses a hybrid drive arrangement for a hybrid vehicle comprising a thermal engine that is capable of being operated on a fuel containing hydrocarbons and capable of generating oxygen. A storage device is provided for the fuel containing hydrocarbons and an energy storage device for the energy generated by the thermal engine. A drive motor is supplied, depending on the operating state, by energy from the thermal engine and/or the energy stored in the energy storage device. A hydrogen-generating unit is connected to receive fuel from the fuel storage and generates hydrogen from the combustible fuel. There is no storage device for the hydrogen generated from the fuel containing hydrocarbons. According to the method of operation, the thermal engine is operated in a higher driving load range on the fuel containing hydrocarbons and on the hydrogen in a lower driving range, as well as during starting and warm-up, at a stationary emission-minimizing operating point, with any remaining power required being covered by the energy storage device.

U.S. Pat. No. 4,112,875 discloses a hydrogen-oxygen fueled internal combustion stationary engine which utilizes an inert gas, such as argon, as a working fluid to increase efficiency of the engine to reduce pollution, and facilitate operation of a closed cycle energy system. In a system where sunlight or other intermittent energy source is available to separate hydrogen and oxygen from water, the oxygen and inert gas are taken into a diesel engine into which the hydrogen gas is injected and ignited. The exhaust gas is cooled so that it contains only water and the inert gas. The inert gas in the exhaust is returned to the engine for use with fresh oxygen, while the water in the exhaust is returned for reconversion to hydrogen and oxygen. Storage devices are provided for the hydrogen and oxygen.

U.S. Pat. No. 5,656,916 discloses apparatus for controlling the currents supplied for battery charging and an electric load during charging of an electric vehicle battery.

U.S. Pat. No. 6,054,838 discloses a method and apparatus for electrical storage and pressure charging, by compressed fluid through a venturi, the electrical storage where the electrical storage can take the form of a battery for operating a motor vehicle and electrical charges are produced by a generator operated by a turbine connected to a pressurize storage tank operated when the storage falls below a prescribed level and in the method, stored compressed fluid operates a generator for charging the electrical storage.

U.S. Pat. Nos. 6,044,922 and 6,081,042 disclosed hybrid vehicles having various combinations of control devices and drive motors.

Motor vehicles have also used propane gas stored a pressurized tank and as an alternative to gasoline as alternate source of fuel to power an internal combustion engine for driving the vehicle.

In hybrid electric vehicles and in electric cars, the batteries function as a direct current voltage storage device. The batteries are typically charged prior to use using an alternating current and known battery charging systems using alternating current-to-direct current converters. Internal combustion engines may be used to drive battery-charging circuits and/or direct current voltage generators as means for maintaining a charge on the batteries during operation of the vehicle. Fuel cells, forming part of an energy battery, are connected in parallel control switch. Fuel to the power battery via an energy battery cells have been used for maintaining a charge on the power battery.

Due to the absence of standard methods and apparatus for charging batteries in hybrid electric vehicles and electric cars, different manufacturers of electric vehicles use different charging circuits thereby requiring the user to locate and use a charging system designed for the vehicle. This results in an inconvenience to the user, one of many objections and reasons inhibiting use of electric vehicles.

Another problem associated with prior art electric vehicles is the inefficient use of fuel cells that convert hydrogen into electricity for charging the batteries.

Further, there is not a standard method, apparatus or system available for offering alternative standardized electrical energies or combustible fuels for charging or servicing a hybrid electric vehicle or electric car which are equivalent to services offered in service stations for standard gas or diesel powered motor cars using internal combustion engines.

BRIEF SUMMARY OF THE INVENTION

The present invention discloses and teaches a new, novel and unique hybrid electric vehicle having alternate power sources for powering or driving a hybrid electric vehicle. This invention enables the hybrid electric vehicle to be serviced using a standard alternating current source, a standard direct current source and/or a standard combustible fuel source.

The hybrid electric vehicle of the present invention includes an alternating current to direct current converter for producing and storing a direct current voltage in a direct current voltage storage device. A fuel converter that receives a composition combustible fuel in a first state converts the fuel into a combustible fuel in a second state and the combustible fuel in the second state is stored in a combustible fuel storage device. A driving system that transports the hybrid electric vehicle includes a direct current motor which is operatively coupled to the driving system and to the direct current voltage storage device. The direct current motor is responsive to the stored direct current voltage for driving the driving system in response to a first control signal. A combustible fuel engine is operatively coupled to the driving system is responsive to the stored combustible fuel in the second state for driving the driving system in response to a second control signal. A control device is operatively connected to the direct current motor and to the combustible fuel engine to selectively apply the first control signal to the direct current-motor or the second control signal to the combustible fuel engine to enable the driving system to be driven by the direct current voltage or the combustible fuel. The combustible fuel engine may also be powered by the composition combustible fuel.

In addition, a new and novel method of driving or powering a motor vehicle with alternate fuel sources is disclosed and taught by the present invention. The method comprises the steps of producing with an alternating current to direct current converter a direct current voltage; storing the direct current voltage in a direct current voltage storage device; receiving with a fuel converter a fuel in a first state and converting the fuel into a combustible fuel in a second state; storing the combustible fuel in the second state in a combustible fuel storage device; transporting with a driving system the motor vehicle wherein the driving system is responsive to a direct current motor operatively coupled to the direct current voltage storage device and the direct current motor is responsive to stored direct current voltage for driving the driving system in response to a first control signal and a combustible material engine operatively coupled to the driving system is responsive to stored combustible fuel in the second state for driving the driving system in response to a second control signal; and selectively applying with a control device operatively connected to the direct current motor and to the combustible material engine the first control signal to the direct current motor or the second control signal to the combustible fuel engine to enable the driving system to be driven by the direct current voltage or the combustible fuel.

In the method, step of selectively applying may include the control device selectively applying both the first control signal to the direct current motor and the second control signal to the combustible fuel engine to enable the driving system to be concurrently driven by the direct current voltage and the combustible fuel.

The problem associated with the absence of standard methods for charging batteries in a hybrid electric vehicle is overcome by use of a direct current voltage storage device and a combustible fuel storage device wherein the alternative energy sources are prestored and available in the hybrid electric vehicle prior to use.

A service facility for a hybrid electric vehicle utilizing the teachings of the present invention may offer any one of or all of the following energies: (i) an alternating current, such as for example a 120/240 volt, 60 hertz, single phase, alternating current or a 120/240 volt, 60 hertz, three phase alternating current or a 120/208 volt, 60 hertz three phase alternating current, which can be plugged into the hybrid electric vehicle or electric car to charge the direct current voltage storage device such as for example, a battery, and/or power a fuel converter to produce and store a combustible fuel in a combustible fuel storage device; (ii) a direct current voltage having a standard electrical characteristic, say for example, 12 volts DC, for directly charging a power battery thereby eliminating or bypassing the need for an AC/DC converter, the specifications of which may vary by manufacturer; (iii) filling or charging a combustible fuel storage device directly with a combustible fuel which would otherwise be produced by a composition combustible fuel; or (iv) a composition combustible fuel such, as gasoline or other similar composition combustible fuel.

Thus, different charging circuits from different manufacturers will no longer pose a problem because a standard 120/240 volts, 60 Hertz alternating current source may be used to charge the direct current voltage storage device, e.g. battery, and the combustible material storage device can be charged with a combustible fuel, e.g. hydrogen in a pressurized tank.

The prior art problems of the battery being discharged during use or operation is overcome by use a combustible fuel storage device that can be replenished during use by a fuel cell or fuel converter using an organic fuel, such as for example methanol, and the converter converts the same to a combustible fuel, such as for example hydrogen, which is stored, used to recharge a battery or drive the combustible fuel engine depending on the power needs.

As improved fuel cells are developed, the types of fuel that can be used to generate the hydrogen or other combustible fuel will become more extensive. Such known fuels include gasoline, hydrolysis of water, pure hydrogen and methanol or other composition combustible fuels that can be converted into a combustible fuel to power recharging of a battery or as fuel for a combustible fuel engine.

As economical and safe minirefineries are developed that can be installed into hybrid electric vehicles for use in converting-fuels into hydrogen or other combustible fuels, such as for example to convert methanol into hydrogen to feed a fuel cell or for use as a combustible fuel to power a vehicle, the use of a separate fuel converter and combustible fuel storage device, as disclosed and taught herein, results in an effective system for powering a hybrid electric vehicle from alternative fuel sources. Such hybrid electric vehicles can be serviced by a service facility offering the alternative fuels in the same manner as gasoline service stations offer multi-grade unleaded fuels for gasoline motor vehicles and diesel fuel for motor vehicles.

None of the known prior art anticipate, disclose, teach or suggest a hybrid electric vehicle having a driving system driven by a direct current motor powered by a battery and a internal combustion engine powered by a combustible fuel adapted to be connected to alternating current for charging the battery and wherein the hybrid electric vehicle comprises a fuel converter for receiving a composition combustible fuel in a first state and converting the composition combustible fuel into a combustible fuel in a second state and for storing the combustible fuel in the second state in a combustible fuel storage device. Further, the prior art does not disclose, teach or suggest a control device that is operatively connected to and controls the direct current motor for driving the driving system in response to a first control signal and the combustible fuel engine powered from a separate combustible fuel storage device or from composition fuel stored in a composition fuel storage device for driving the driving system in response to a second control signal. The control device is adapted to selectively applying the first control signal to the direct current motor or the second control signal to the combustible fuel engine to enable the driving system to be driven by the direct current voltage or the combustible fuel or the composition combustible fuel.

Therefore, one advantage of hybrid electric vehicle of the present invention is that fuel converter is adapted to receive a composition combustible fuel stored in the vehicle in a first state and to convert the composition combustible fuel into a combustible fuel in a second state and for storing the combustible fuel in the second state in a combustible fuel storage device. The vehicle can use either or both power sources for driving or powering the vehicle.

Another advantage of the present invention is that the combustible fuel converter is responsive to a source of alternating current for converting the composition combustible fuel into a combustible fuel in a second state and for storing the combustible fuel in the second state in a combustible fuel storage device.

Another advantage of the present invention is that a service facility can offer an alternating current voltage, a direct current voltage and a combustible fuel to charge or fill each of the separate storage devices which are separate from a standard composition combustible fuel storage tank which stores a standard composition combustible fuel such as gasoline, methanol or the like.

A still another advantage of the present invention is that the hybrid electric vehicle control device controls the alternating current source to enable the battery charger to charge the battery to a desired charging level and the fuel converter to fill the combustible fuel storage device to a desired volume level.

A still another advantage of the present invention is that the control device in the hybrid electric vehicle can concurrently apply the first control signal to the direct current motor and the second control signal to the combustible material engine to enable the driving system to be driven by the direct current voltage, the combustible fuel or composition combustible fuel.

A still yet another advantage of the present invention is that a novel method of driving a motor vehicle with alternate fuel sources is disclosed and taught by the present invention.

BRIEF DESCRIPTION OF THE DRAWING

The foregoing and other advantages of this invention will be apparent from the following description of the preferred embodiment of the invention when considered with the illustrations and accompanying drawings, which include the following Figures.

DETAILED DESCRIPTION OF THE INVENTION

Typically, a hybrid electric vehicle includes a driving system that is driven by either or both a direct current motor powered by a battery and an internal combustion engine powered by a composition combustible fuel such as gasoline. A battery-charging device is adapted to be connected to a source of alternating current for charging the battery. The battery is charged to a desired charging level prior to use. The hybrid electric vehicle may be driven by a separate internal combustion engine powered by a composition combustible fuel such as gasoline. During operation, the hybrid electric vehicle may include various means for keeping the battery charged such as regenerative braking systems, flywheel charging systems or by use of direct current generators driven by the internal combustion motor. The present invention as disclosed and described herein is adapted to be used with such hybrid electric vehicles.

Figure 1:
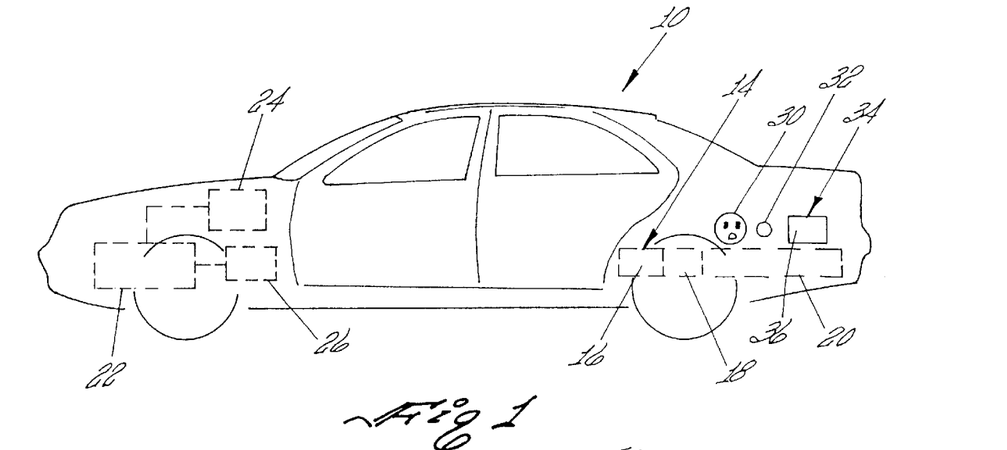
FIG. 1 is a pictorial representation of a hybrid electric vehicle having a direct current voltage storage device, a fuel converter and a driving system which is responsive to a direct current motor and a combustible fuel engine for transporting a hybrid electric vehicle.

In the pictorial representation of FIG. 1, a motor vehicle, which is in the preferred the hybrid electric vehicle, is shown generally as 10 and includes at the rear thereof a combustible fuel storage area 14 having a fuel converter 16 and a combustible fuel storage device 18. Also located in the rear of the vehicle 10 is a direct current voltage storage device 20.

The vehicle 10 includes a composition combustible fuel filling and storage system that is depicted by 34 having an inlet 36 to receive and pass a composition combustible fuel for storage in a tank, such as for example, gasoline, wherein the tank is part of the composition combustible fuel filling and storage system 34.

The hybrid electric vehicle includes an alternating current to direct current converter for producing and storing a direct current voltage in the direct current voltage storage device 20. Such a converter is generally known as a battery charger that is adapted to be operatively connected to an alternating current source. In addition, a direct current voltage source can be connected to the vehicle to directly charge the battery with a direct current. The input plug adapted to be connected to either an alternating current source or direct current voltage source is shown as 30. The orifice for enabling the charging or filling of a combustible fuel storage device with a combustible fuel, such as hydrogen, is generally shown as inlet 32. The front of the vehicle 10 includes a driving system 22 for transporting a hybrid electric vehicle that is driven by a direct current motor 24 and a combustible fuel engine 26.

The direct current voltage storage device 20 are main power batteries, such as for example lead-acid batteries, lithium batteries or other rechargeable batteries adapted for use in hybrid electric vehicle.

Figure 2:
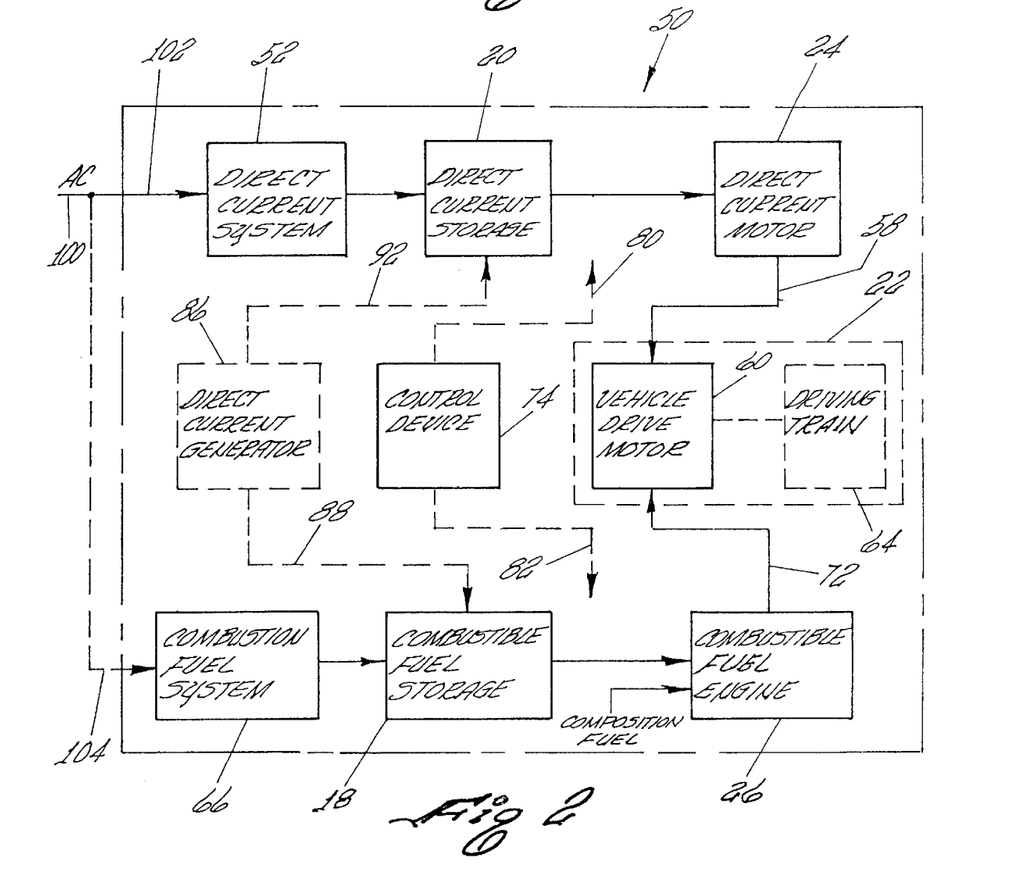
FIG. 2 is a block diagram of a hybrid electric vehicle wherein a control device controls an alternating current source to enable the battery charger to charge the battery to a desired charging level and a fuel converter produces a combustible fuel for filling the combustible fuel storage device to a desired volume level or weight.

The block diagram of FIG. 2 illustrates a vehicle control system shown generally as 50 for a hybrid electric vehicle. The includes a direct current-charging system 52 which, prior to starting of the vehicle, converts an alternating current voltage 100 applied thereto by input 102 to produce a direct current voltage for storage in a direct current voltage storage device 20.

The control system 50 includes a driving system 22 for transporting a hybrid electric vehicle. The driving system 22 includes a vehicle drive motor 60 and driving train 64 which drives or transport the vehicle. A direct current motor 24 is operatively coupled to the vehicle drive motor 60 of the driving system 22 and to the direct current voltage storage device 20. The direct current motor 24 is responsive to a stored direct current voltage for driving the vehicle drive motor 60 in response to a first control signal from a control device 74. The control device 74 is operatively coupled to, monitors, senses and/or controls each of the various components via conductors 82.

Figure 3:
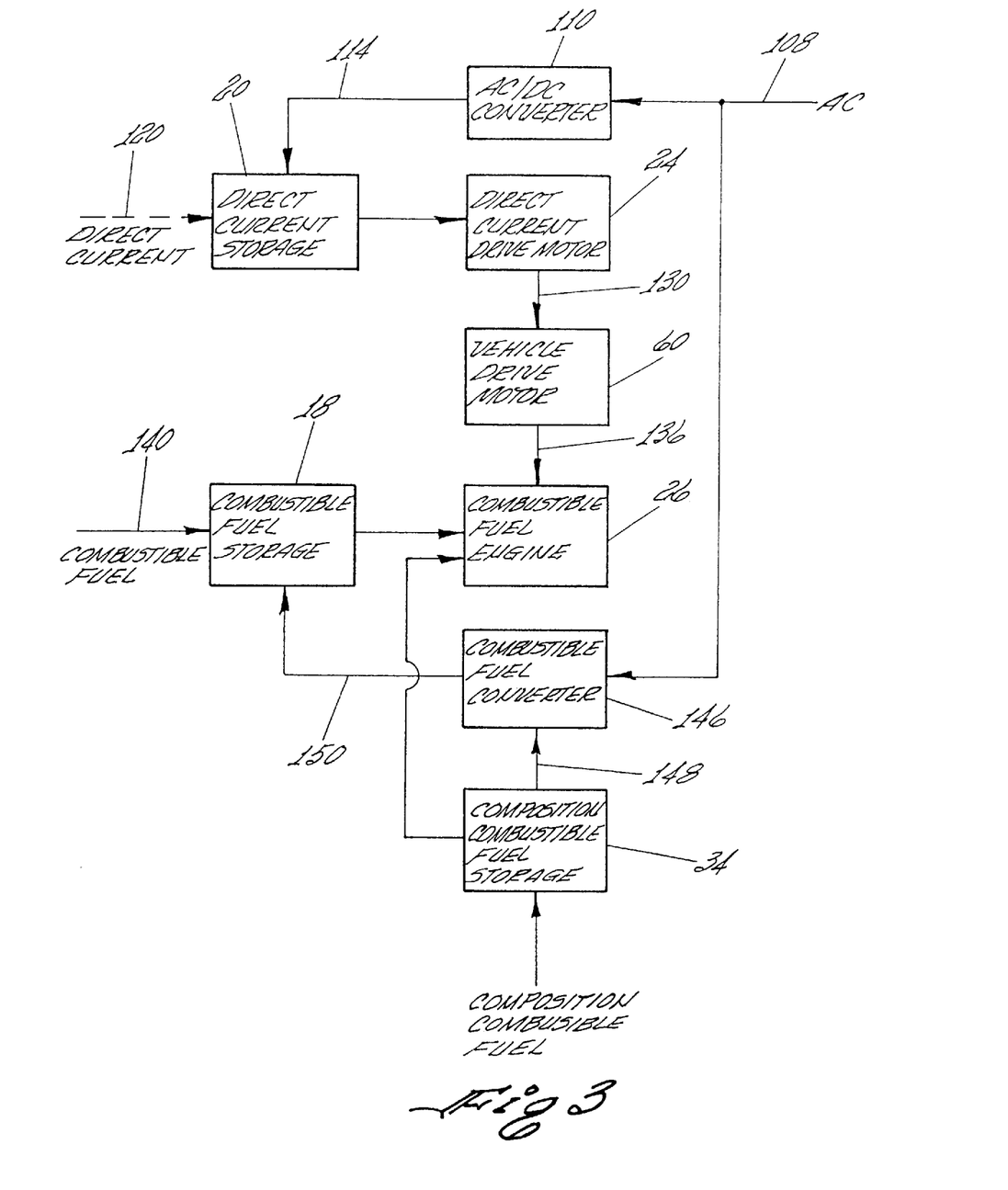
FIG. 3, is a block diagram of a hybrid electric vehicle using the teachings of the present invention which is capable of charging a direct current voltage storage device either directly from a direct current source or from an alternating current source and an AC/DC converter.

A composition fuel system, shown generally as 66, includes a fuel converter, such as for example a fuel converter shown as 146 in FIG. 3, for receiving a composition combustible fuel in a first state and converting the fuel into a combustible fuel in a second state. For example, the composition combustible fuel may be an organic fuel such as methanol, which is in liquid form as a first state. The fuel converter may produce hydrogen from methanol, a combustible fuel in the form of a gas which is a combustible fuel in a second state. The combustible fuel in the second state is a gas is stored in the combustible fuel storage 68. It is envisioned that the gas could be stored under a pressure which causes the gas to become liquefied. The composition combustible fuel in the first state could likewise be a liquid.

In FIG. 2, the combustible fuel may be a combustible fuel such as hydrogen. The combustible fuel is stored in a separate combustible fuel storage 18 which can be filled to a desired volume or weight. The fuel converter 146 can be used to maintain or replenish the volume or weight of combustible fuel in the combustible fuel storage device 18 during operation of the hybrid electric vehicle.

In FIG. 2, the composition fuel system 66 is adapted to receive an alternating current, prior to starting of the vehicle, and to be responsive thereto to cause the fuel converter 146 to produce the combustible fuel which is stored in the combustible fuel storage device 18.

A combustible fuel engine 26 is operatively coupled via a coupling member 72 to the vehicle drive motor 60 of the driving system 62. The vehicle drive motor 60 drives the drive train 64. The combustible fuel motor 26 is responsive to the stored combustible fuel in the second state or the composition combustible fuel for driving the driving system 62 in response to a second control signal from the control device 74.

The control device 74 is operatively connected to the direct current motor 24 and to the combustible fuel engine 26 via conductors 80 and 82 to selectively apply the first control signal to the direct current motor 24 or the second control signal to the combustible fuel engine 26 to enable the driving system 62 to be driven by the direct current voltage or the combustible fuel. In a typical hybrid electric vehicle, the control device 74 via conductors 80 and 82 controls the alternating current sources 100 and 104 to enable a battery charger to charge a battery to a desired charging level and the fuel converter to fill the combustible fuel storage device to a desired volume or weight level.

The control device 74 may selectively apply both the first control signal to the direct current motor 24 and the second control signal to the combustible fuel engine 26 via conductors 80 and 82 to enable the driving system 62 to be concurrently driven by the direct current voltage source and the composition fuel stored in the combustible fuel storage device.

The combustible fuel storage device 18 can be used to drive a direct current generator 86 to produce a direct current voltage that is applied via conductor 92 to the direct current voltage storage device 20. The direct current generator 86 may be a fuel cell, a motor powered by the combustible fuel to drive a direct current generator, a motor powered by the combustible fuel to drive an alternating current generator which is applied to a converter to produce a direct current voltage or other direct current generating devices as are known in the art.

In the block diagram of FIG. 3, the a hybrid electric vehicle, using the teachings of the present invention, is capable of charging a direct current voltage storage device 20 either directly from a direct current voltage source 120 or from an alternating current source 100 and an AC/DC converter 110. The AC/DC converter 110 applies the direct current voltage to the direct current voltage storage device 20 via a circuit depicted by lead 114.

A composition combustible fuel storage device 34 for storing a composition combustible fuel for powering the combustible fuel engine 26 as shown in FIG. 3 can be filled from a source such as the source labeled "composition combustible fuel". Examples of a composition combustible fuel would include gasoline or methanol, which can be converted into a combustible fuel such as for example, hydrogen. The composition combustible fuel from the storage device 34, in its first state, would be applied to a combustible fuel converter 146 via a transfer system depicted by lead 148.

The combustible fuel produced by the converter 146 is applied by conduit 150 to the combustible fuel storage device 18 where the combustible fuel is stored in its second state.

In the alternative, the combustible fuel stored in a separate combustible fuel storage device 18 on the hybrid vehicle for powering the combustion fuel engine 26 can be supplied from an external source depicted by arrow 140. This may be supplied by a filling station.

The direct current voltage stored in the direct current voltage storage device 20 is applied to a direct current motor 24 to drive the vehicle drive motor 60 via a coupling member depicted by lead 130. The vehicle drive motor 60 may be powered by a combustible fuel engine 26 which applies the power to the vehicle drive motor 60 by a coupling member depicted by lead 136.

Figure 4:
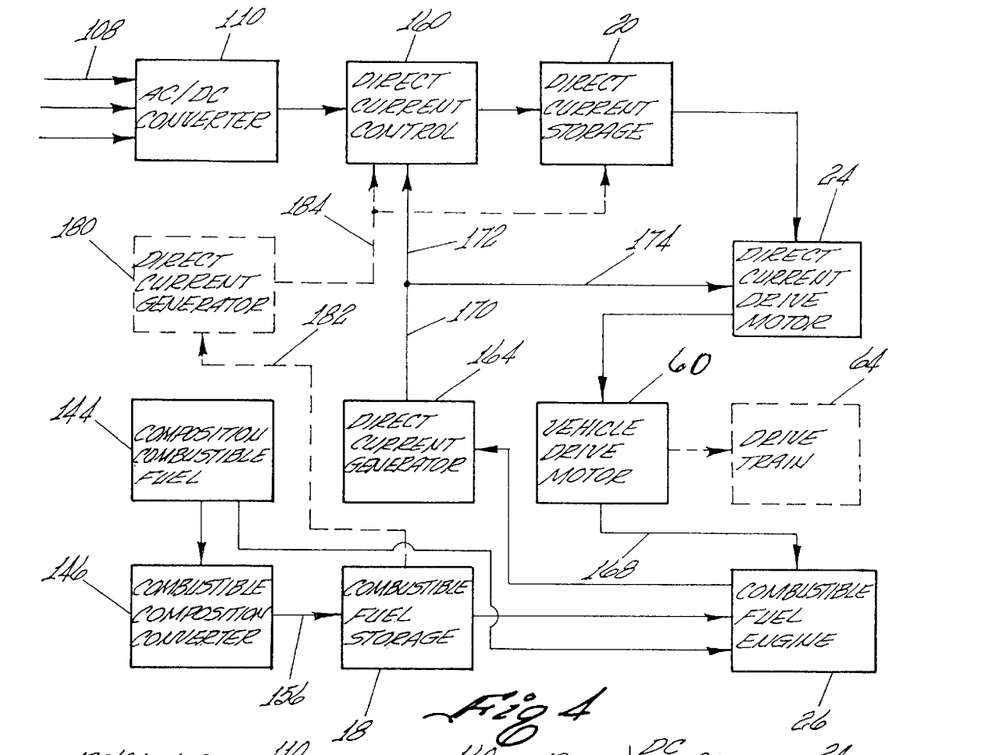
FIG. 4 is a block diagram illustrating another embodiment of a hybrid electric vehicle using the teachings of the present invention wherein a direct current generator is used for charging a battery.
Figure 5:
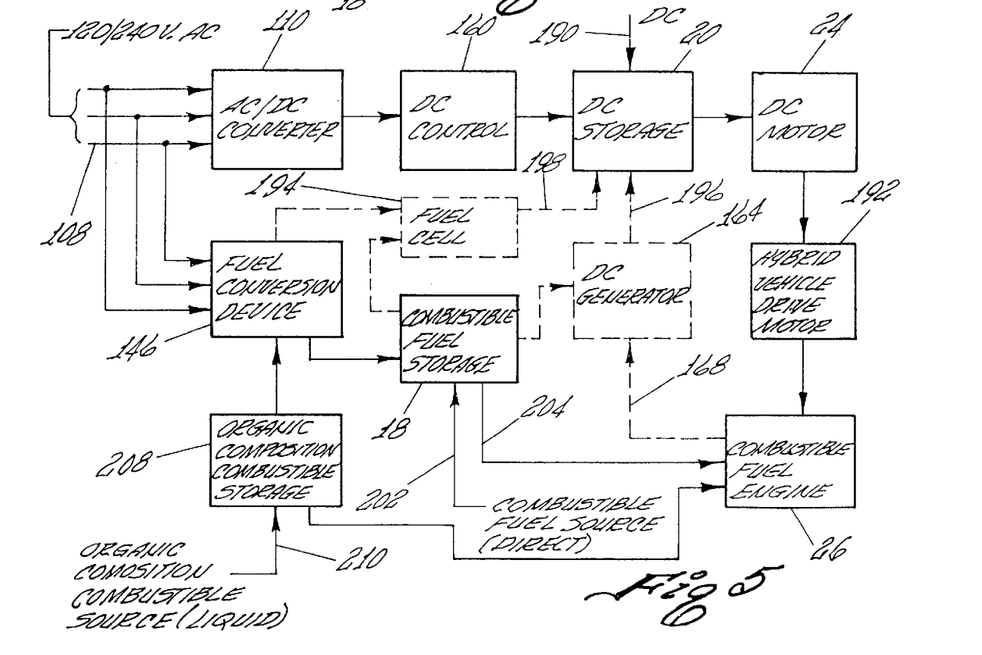
FIG. 5 is a block diagram illustrating yet another embodiment of a hybrid electric vehicle using the teachings of the present invention wherein a fuel conversion device is used for charging a combustible fuel storage device for powering a direct current generator or for charging a battery.

In FIGS. 4 and 5, the common elements are identified with the same numerals. In the embodiment of FIG. 4, a direct current generator driven 164 powered from the combustible fuel engine 26 is used to produce a direct current for charging a battery. In the embodiment of FIG. 5, a fuel conversion device, which may be a fuel cell, can be used to produce a direct current voltage for directly charging a direct current voltage storage device 20 such as a battery.

FIGS. 4 and 5 illustrate a dual fuel source for a motor vehicle. The motor vehicle comprises an alternating current to direct current converting system located on a motor vehicle which includes an AC/DC converter 110 and a direct current control 160 to produce a direct current voltage having predetermined electrical characteristics. The source of an alternating current is depicted by input 108.

A direct current voltage storage device 20, located on the motor vehicle, is used for storing the direct current voltage. The direct current voltage is selectively applied to a direct current drive motor 24 as described herein.

In FIG. 4, a fuel composition system located on the motor vehicle includes a composition combustible fuel storage device 34 for storing a composition combustible fuel for powering the combustible fuel engine 26, a composition combustible fuel converter 146 and a combustible fuel storage device 18 wherein the combustible fuel produced by converter 146 is applied via conduit 150 to the combustible fuel storage device 18. The combustible fuel storage device 18 applies the combustible fuel to a combustible fuel engine 26 which powers the hybrid vehicle drive motor 60 which, in turn, drives or powers a drive train depicted as 64 to transport the motor vehicle. A control device similar to control device 74 in FIG. 3 provides the control signals as described hereinbefore to control the operation of the direct current motor 24 and the combustible fuel engine 26.

In FIG. 4, as the direct current voltage stored in the direct current voltage storage device 20 is depleted, it can be replenished during operation by a direct current voltage produced from a direct current generator 164 which is powered by the combustible fuel engine 26 via a coupling member depicted by lead 168. The direct current voltage is applied via lead 170 to either or both of the direct current control 160 via a conductor depicted by lead 172 to recharge the storage device 20 or be applied via a conductor depicted by lead 174 directly to the direct current motor 24.

In the alternative, a direct current generator, depicted by dashed box 180, which could be for example, a fuel cell, would receive the combustible fuel from the combustible fuel storage device 18 via a conduit 182 and produce a direct current voltage which could be applied to the direct current control 160 via a conductor depicted by lead 184 to recharge the direct current voltage storage device 20 or directly to the direct current storage device 20.

A control device 74 programs and controls the use of the direct current generated by generators 164 and 180 to maintain maximum efficiency. When the hybrid electric vehicle is operatively connected to an alternating current source, the control device 74 enables the production of a direct voltage from at least one of an alternating current source and the combustible fuel.

In FIG. 5, the fuel conversion device 146 has an organic composition combustible fuel supplied thereto from a composition combustible fuel storage 208 which is filled from a composition combustible fuel source depicted by arrow 210 and which is used to power the combustible fuel engine 26.

An alternating current source, such as for example a 120/240 voltage 60 hertz, three phase system, could be used to provide the electrical power to both charge a battery, depicted by the DC storage 112, and to power the fuel conversion device 146. The AC source 108 would be applied to an AC/DC converter 110 as described above. The AC source 206 would be applied to the fuel converter 146 to produce the combustible fuel to fill or charge the combustible fuel storage device 18 from an organic composition combustible fuel which is stored in the fuel storage 208. The combustible fuel from the combustible fuel storage device 18 is applied to the combustible fuel engine 26 via the fuel system depicted by lead 204. Also, a combustible fuel from a source 202, e.g. a service facility, can be loaded in to the combustible fuel storage device 18. As such, the fuel converter receives a composition fuel in a first state and converts the composition fuel into a combustible fuel in a second state for storing the combustible fuel in a combustible fuel storage device prior to the starting of or the operation of the hybrid electric vehicle.

The combustible fuel from the combustible fuel storage device 18 can be applied to a combustible fuel-to-DC generator 164 to generate a direct current voltage which is directly applied to the direct current voltage storage device 20 via a conductor depicted by lead 196. In the alternative, a direct current voltage from an external source depicted by arrow 190 could be applied directly to and charge the direct current voltage storage 20. This may be supplied from a service station facility.

Also, in the alternative, the combustible fuel engine 26 can power a direct current generator 164 via a coupling member 168 to produce the direct current voltage.

A fuel cell shown by dashed box 194 could be supplied with a combustible fuel from the fuel conversion device 146 or from the combustible fuel storage 18. The fuel cell 194 produces a direct current voltage which could be applied to the direct current voltage storage 20 via a conductor depicted by lead 198. The fuel cell 194 would be powered by the combustible fuel source 200 in lieu of powering the fuel conversion device 146 from an alternating the current source 206.

The hybrid electric vehicle depicted by FIG. 5 would use control device 74 to enable the production of a direct current voltage from at least one of an alternating current source and the combustible material or combustible fuel and the applying of the produced direct current voltage to the direct current voltage storage device 20. Also, the control device could apply the produced direct current voltage to at least one of the direct current motor 116 and the direct current voltage storage device 20.

This invention has utility for use in a hybrid electric vehicle having: (i) a driving system driven by a direct current motor powered by a battery; (ii) an internal combustion engine powered by a combustible fuel or a composition combustible fuel; and (iii) a battery charging device adapted to be connected to a source of alternating current for charging the battery. In practicing this invention, the hybrid electric vehicle would include a fuel converter for receiving a composition combustible fuel in a first state and for converting the composition combustible fuel into a combustible fuel in a second state and for storing the combustible material or combustible fuel in the second state in a combustible fuel storage device for use as an alternative energy source.

In such a hybrid electric vehicle, a control device is operatively connected to and controls the direct current motor for driving the driving system in response to a first control signal and to the internal combustible engine for driving the driving system in response to a second control signal. The control device is adapted to selectively apply at least one of the first control signal to the direct current motor 116 and the second control signal to the internal combustible engine 134 to enable the driving system including vehicle drive motor 128 to be driven by at least one of combustible fuel or composition combustible fuel.

In the alternative, the control device may concurrently apply the first control signal to the direct current motor and the second control signal to the internal combustible engine to enable the driving system to be driven by at both the direct current voltage and at least one of the combustible fuel or composition combustible fuel, when necessary for additional power.

In the embodiment of the hybrid electric vehicle of FIG. 5, the control device controls the alternating current source to enable the battery charger to charge the battery to a desired charging level and to concurrently power the fuel converter to fill the combustible fuel storage device to a desired volume level or weight.

This invention also discloses and teaches a method of driving a motor vehicle with alternate fuel sources comprising the steps of: (a) producing with an alternating current to direct current converter a direct current voltage; (b) storing the direct current voltage in a direct current voltage storage device; (c) receiving with a fuel converter a fuel in a first state and converting the fuel into a combustible material in a second state; (d) storing the combustible matter in the second state in a combustible fuel storage device; (e) transporting with a driving system the motor vehicle wherein the driving system includes a direct current motor operatively coupled to the direct current voltage storage device and the direct current motor is responsive to stored direct current voltage for driving the driving system in response to a first control signal and a combustible material engine operatively coupled to the driving system is responsive to stored combustible fuel in the second state or stored composition combustible fuel for driving the driving system in reponse to a second control signal; and (f) selectively applying with a control device operatively connected to the direct current motor and to the combustible fuel engine at least one of the first control signal to the direct current motor and the second control signal to the combustible fuel engine to enable the driving system to be driven by the direct current voltage and the combustible fuel.

The method during the step of selectively applying may include the control device selectively applying both the first control signal to the direct current motor and the second control signal to the combustible fuel engine to enable the driving system to be concurrently driven by the direct current voltage and at least one of the combustible fuel or composition combustible-fuel.

Hybrid Drive For a Motor Vehicle Using a Hydrocarbon Containing Fuel for Generating Hydrogen This invention also apples to a hybrid drive for a motor vehicle of the type disclosed in U.S. Pat. No. 5,785,136 having a thermal engine. Such a thermal engine can be operated with a hydrocarbon containing fuel suitable for generating hydrogen, include a fuel storage tank for storing said fuel, energy storage device in which the energy generated by the thermal engine can be stored, and a drive motor whose operating state depends on the energy from the thermal engine and/or the energy storage device. The hybrid drive using the teachings of the present invention comprise an alternating current to energy converter for producing and storing energy in the energy storage device prior to starting of a hybrid drive for a motor vehicle; a hydrogen storage device located on the motor vehicle; a hydrogen-generating unit operatively connected to the fuel storage tank and to the hydrogen storage device for receiving a hydrocarbon containing fuel and for generating hydrogen therefrom and prior to starting or operation of the hybrid drive for a motor vehicle storing hydrogen in the hydrogen storage device. The thermal engine can be operated alternatively on hydrogen generated by the hydrogen-generating unit or hydrogen stored in the hydrogen storage device. The thermal engine is configured for optional operation on fuel from the storage tank when the motor vehicle is in a higher driving load range, and for operation on at least one of hydrogen generated by the hydrogen-generating unit and hydrogen stored in the hydrogen storage device when the motor vehicle is in a lower driving range.

It is also envisioned that a method of operating a vehicle with a hybrid drive arrangement of the type having a thermal engine that can be operated with a hydrocarbon containing fuel suitable for generating hydrogen, a fuel storage tank for storing said fuel, an energy storage device in which the energy generated by the thermal engine can be stored, and a drive motor whose operating state depends on the energy from the thermal engine and/or the energy storage device utilizing the teachings of this invention is shown. The vehicle would further include an alternating current to energy converter for producing and storing energy in the energy storage device prior to starting of a hybrid drive for a motor vehicle; a hydrogen storage device located on the vehicle; a hydrogen-generating unit operatively connected to the fuel storage tank and to the hydrogen storage device for receiving hydrocarbon containing fuel and generating hydrogen therefrom and prior to starting or operation of the hybrid drive for a vehicle storing hydrogen in the hydrogen storage device and wherein the thermal engine is configured for optional operation on fuel from the storage tank, hydrogen generated by the hydrogen-generating unit and hydrogen stored in the hydrogen storage device. The method comprises the steps of: in a higher driving load range, operating the thermal engine on fuel from the fuel tank; and in a lower driving load range, and during starting and operation, optionally operating the thermal engine on hydrogen generated by the hydrogen-generating unit or hydrogen stored in the hydrogen storage device, the engine being held at a low-emission operating point; whereby during operating phases in which the thermal engine is operated on hydrogen, and a required driving power exceeds power generated by the thermal engine operated at the fixed operating point, an excess power requirement is supplied from the energy storage.

This invention also relates to a hybrid drive arrangement for a motor vehicle having comprising in combination a combustion engine which can be operated on hydrogen and on a hydrocarbon containing fuel from which hydrogen can be generated; a fuel tank for storing hydrocarbon-containing fuel from which hydrogen can be generated; a storage device for storing energy from the combustion engine; an alternating current to energy converter for producing and storing energy in the energy storage device prior to starting of a hybrid drive for a motor vehicle; a hydrogen storage device located on the motor vehicle; a hydrogen-generating unit operatively connected to the fuel storage tank and to a hydrogen storage device for receiving a hydrocarbon containing fuel and for generating hydrogen therefrom and prior to starting or operation of the hybrid drive for a motor vehicle storing hydrogen in the hydrogen storage device; a traction motor for driving the vehicle, the traction motor being coupled to receive energy from the combustion engine and from the storage means; a fuel converter for generating hydrogen from the fuel stored in the fuel tank; and a control device for selectively providing either hydrogen from the fuel converter, hydrogen from the hydrogen storage device or fuel from the fuel tank to operate the combustion engine. The combustion engine is configured for optional operation on fuel from the storage tank when the vehicle is in a higher driving load range, and for optional operation on hydrogen from the hydrogen-generating unit or hydrogen from the hydrogen storage device when the vehicle is in a lower driving range. In the combination, the control device further controls said hybrid drive arrangement to operate the combustion engine on the hydrocarbon containing fuel from the fuel tank during periods of higher output power requirements and optionally on hydrogen from the fuel converter or the hydrogen storage device during periods of lower output requirements, and during starting and warm-up periods for the combustion engine.

In the combination, the control device further controls the hybrid drive arrangement to discontinue operation of the combustion engine and operating the traction motor solely on energy from energy storage device.

The control device further controls the hybrid drive arrangement to be operative when the combustion engine is operated on hydrogen and a required driving power exceeds power generated by the combustion engine, to cause said energy storage device to provide energy to the traction motor.

The fuel converter prior to start-up is responsive to the alternating current for converting the hydrocarbon containing fuel into hydrogen and storing the hydrogen in the hydrogen storage device. The fuel converter converts and stores a sufficient quantity of hydrogen in the hydrogen storage device to at least start and warm-up said thermal engine in the vehicle. The fuel converter converts and stores a sufficient quantity of hydrogen in the hydrogen storage device to enable the control device to optionally at least start and warm-up the thermal engine in the vehicle using hydrogen or stored energy whereby the thermal engine is held at a low-emission operating point.

Based on the teaching of the present invention, a method of operating a vehicle with a hybrid drive arrangement of the type having a thermal engine that can be operated with a hydrocarbon containing fuel suitable for generating hydrogen, a fuel storage tank for storing the fuel, an energy storage device in which the energy generated by the thermal engine can be stored, and a drive motor whose operating state depends on the energy from the thermal engine and/or the energy storage device is disclosed. A vehicle using the teachings of the present invention further includes: an alternating current to energy converter for producing and storing energy in the energy storage device prior to starting of a hybrid drive for a motor vehicle; a hydrogen storage device located on the vehicle; a hydrogen-generating unit operatively connected to the fuel storage tank and to the hydrogen storage device for receiving hydrocarbon containing fuel and generating hydrogen therefrom and prior to starting or operation of the hybrid drive for a vehicle storing hydrogen in the hydrogen storage device and wherein the thermal engine is configured for optional operation on fuel from the storage tank, hydrogen generated by said hydrogen-generating unit and hydrogen stored in the hydrogen storage device. The method comprises the steps of: in a higher driving load range, operating the thermal engine on fuel from the fuel tank; and in a lower driving load range, optionally operating the thermal engine on hydrogen generated by said hydrogen-generating unit or hydrogen stored in the hydrogen storage device, the engine being held at a low-emission operating point.

A method of operating a vehicle with a hybrid drive arrangement of the type having a thermal engine that can be operated with a hydrocarbon containing fuel suitable for generating hydrogen, a fuel storage tank for storing the fuel, an energy storage device in which the energy generated by the thermal engine can be stored, and a drive motor whose operating state depends on the energy from the thermal engine and/or the energy storage device is envisioned. In practicing this invention the vehicle may further include: an alternating current to energy converter for producing and storing energy in the energy storage device prior to starting of a hybrid drive for a motor vehicle; a hydrogen storage device located on the vehicle; a hydrogen-generating unit operatively connected to the fuel storage tank and to the hydrogen storage device for receiving hydrocarbon containing fuel and generating hydrogen therefrom and prior to starting or operation of the hybrid drive for a vehicle storing hydrogen in the hydrogen storage device and wherein the thermal engine is configured for optional operation on fuel from the storage tank, hydrogen generated by the hydrogen-generating unit and hydrogen stored in said hydrogen storage device. The method comprising the steps of: during starting and warm-up, optionally operating the thermal engine on hydrogen generated by the hydrogen-generating unit generated or hydrogen stored in the hydrogen storage device, the engine being held at a low-emission operating point; and thereafter, alternatively operating the thermal engine on fuel from the storage tank and optionally hydrogen generated by the hydrogen generating unit or hydrogen stored in the hydrogen storage device.

The thermal engine is shown on the drawings and is represented by combustion fuel engine 26 in FIG. 1. The traction motor is essentially represented by the combustion fuel engine 26 and/or the driving system 22 of FIG. 1. The hybrid drive is essentially represented by the dashed box 22 of FIG. 2.

The fuel conversion device 146 illustrated in FIG. 5 represents a hydrogen-generating unit operatively connected to the fuel storage tank represented by organic composition combustible source 208. The organic composition combustible source 208 is operatively connected to the hydrogen storage device, represented by the combustible fuel storage device 18, for receiving hydrocarbon containing fuel and generating hydrogen therefrom and at least one of prior to starting and operation of the hybrid drive for a vehicle storing hydrogen in the hydrogen storage device and wherein the thermal engine is configured for optional operation on fuel from the storage tank, hydrogen generated by the hydrogen-generating unit and hydrogen stored in said hydrogen storage device.

The control device 74 illustrated in FIG. 2 controls the various components of the hybrid drive in a motor vehicle, under program control, such that during starting and warm-up, the control device optionally operates the thermal engine on hydrogen generated by the hydrogen-generating unit generated or hydrogen stored in the hydrogen storage device enabling the engine to be held at a low-emission operating point and thereafter, alternatively operating the thermal engine on fuel from the storage tank and optionally hydrogen generated by the hydrogen generating unit or hydrogen stored in the hydrogen storage device represented by the combustible fuel source 18 in FIG. 1 through FIG. 5.

A hybrid electric/thermal engine vehicle may comprise both the components of the hybrid drive arrangement of the type having a thermal engine that can be operated with a hydrocarbon containing fuel suitable for generating hydrogen, a fuel storage tank for storing the fuel, an energy storage device in which the energy generated by the thermal engine can be stored, and a drive motor whose operating state depends on the energy from the thermal engine and/or an energy storage device and include an alternating current to direct current converter for producing and storing a direct current voltage in a direct current voltage storage device prior to starting of a hybrid electric vehicle. Such a hybrid electric/thermal engine vehicle may include a fuel converter for receiving a composition fuel in a first state and converting said composition fuel into a combustible material in a second state and for storing said combustible material in a combustible material storage device prior to the starting of or the operation of the hybrid electric vehicle; an input plug adapted to receive an alternating current voltage for at least one of powering said alternating current to direct current converter and powering said fuel converter; a driving system for transporting the hybrid electric/thermal engine vehicle wherein the driving system includes a direct current motor operatively coupled to the driving system and to the direct current voltage storage device wherein the direct current motor being responsive to a stored direct current voltage for driving the driving system in response to a first control signal. The thermal engine or combustible fuel engine is operatively coupled to the driving system and to the combustible material storage device. The combustible fuel engine is responsive to the stored combustible material for driving the driving system in response to a second control signal. The control device is operatively connected to the direct current motor and to the thermal engine or combustible fuel engine to selectively apply the first control signal to the direct current motor or the second control signal to the combustible fuel engine to enable the driving system to be driven by the direct current voltage or the combustible material.

The hybrid electric/thermal engine vehicle may include an orifice adapted to receive and pass a thermal fuel or combustible fuel from a source to a combustible fuel storage device.

The hybrid electric/thermal engine vehicle may further comprise an inlet adapted to receive a combustible material from an external source and transport the combustible material for storage in the combustible material storage device.

The hybrid electric/thermal engine vehicle may further comprise a hydrogen fuel cell configured to receive hydrogen as an input combustible material and to produce a direct current voltage as an output, the hydrogen fuel cell being operatively connected to the combustible material storage device wherein the combustible material stored therein is hydrogen.

The hybrid electric/thermal engine vehicle control device applies the direct current voltage produced by the hydrogen fuel cell to at least one of the direct current voltage storage device and said direct current motor. The control device enables the production of a direct current voltage from at least one of an alternating current source and the hydrogen fuel cell.

It is envisioned that the teachings of the present invention may be used with conventional hybrid electric vehicle using gasoline as the composition combustible fuel for powering an internal combustion engine and re-chargeable batteries for powering a direct current drive motor. This invention would have application in vehicles having a fuel cell, as a secondary battery source, to re-charge a main power battery.

It is further envisioned that as fuel converters are developed which are able to produce a direct current voltage from organic fuels, such as methanol, that such fuel converters would provide direct current for both re-charging a power battery or for directly driving a direct current motor to provide the maximum power for concurrently driving the motor vehicle from two or more energy sources.

All such variations and incorporating of the teachings of the present invention are envisioned to be covered by and anticipated by the teachings set forth herein.

What is claim is:

1. A hybrid drive for a motor vehicle of the type having a thermal engine that can be operated with a hydrocarbon containing fuel suitable for generating hydrogen, a fuel storage tank for storing said fuel, an energy storage device in which the energy generated by the thermal engine can be stored, and a drive motor whose operating state depends on the energy from the thermal engine and/or the energy storage device, said hybrid drive comprising:

an alternating current to energy converter for producing and storing energy in the energy storage device prior to starting of a hybrid drive for a motor vehicle;

a hydrogen storage device located on said motor vehicle;

a hydrogen-generating unit operatively connected to the fuel storage tank and to said hydrogen storage device for receiving a hydrocarbon containing fuel and generating hydrogen therefrom and prior to starting of the hybrid drive for a motor vehicle or during operation of the hybrid drive for a motor vehicle storing hydrogen in said hydrogen storage device and wherein said thermal engine can be operated alternatively on hydrogen generated by said hydrogen-generating unit or hydrogen stored in said hydrogen storage device;

said thermal engine being configured for optional operation on fuel from said storage tank when said motor vehicle is in a higher driving load range, and for operation on hydrogen generated by said hydrogen-generating unit or stored hydrogen when said motor vehicle is in a lower driving load range.

2. The hybrid drive of claim 1 further comprising
a control device for selectively applying both a control signal to said hydrogen-generating unit for receiving a hydrocarbon containing fuel and generating hydrogen therefrom and prior to starting of the hybrid drive for a motor vehicle or during operation of the hybrid drive for a motor vehicle storing hydrogen in said hydrogen storage device and wherein said thermal engine can be operated alternatively on hydrogen generated by said hydrogen-generating unit or hydrogen stored in said hydrogen storage device.

3. The hybrid drive of claim 1 wherein said alternating current to direct current converter includes
a direct current control device for controlling the direct current characteristics of the direct current voltage and for applying said direct current voltage having said predetermined characteristics to said direct current voltage storage device.

4. A method of operating a vehicle with a hybrid drive arrangement of the type having a thermal engine that can be operated with a hydrocarbon containing fuel suitable for generating hydrogen, a fuel storage tank for storing said fuel, an energy storage device in which the energy generated by the thermal engine can be stored, and a drive motor whose operating state depends on the energy from the thermal engine and/or the energy storage device, wherein the vehicle further includes:
an alternating current to energy converter for producing and storing energy in the energy storage device prior to starting of a hybrid drive for a motor vehicle;
a hydrogen storage device located on said vehicle;
a hydrogen-generating unit operatively connected to the fuel storage tank and to said hydrogen storage device for receiving a hydrocarbon containing fuel and generating hydrogen therefrom and prior to starting of the hybrid drive for a vehicle or during operation of the hybrid drive for a vehicle storing hydrogen in said hydrogen storage device and wherein the thermal engine is configured for optional operation on fuel from said storage tank, hydrogen generated by said hydrogen-generating unit and stored hydrogen, said method comprising the steps of:
in a higher driving load range, operating the thermal engine on fuel from the fuel tank; and
in a lower driving load range, and during starting and operation, optionally operating the thermal engine on hydrogen generated by said hydrogen-generating unit or hydrogen stored in said hydrogen storage device, said engine being held at a low-emission operating point; whereby
during operating phases in which the thermal engine is operated on hydrogen, and a required driving power exceeds power generated by the thermal engine operated at the fixed operating point, an excess power requirement is supplied from said energy storage.

5. In a hybrid drive arrangement for a motor vehicle, the combination comprising:
a combustion engine which can be operated on hydrogen and on a hydrocarbon containing fuel from which hydrogen can be generated;
a fuel tank for storing hydrocarbon-containing fuel from which hydrogen can be generated;
storage device for storing energy from said combustion engine;
an alternating current to energy converter for producing and storing energy in the energy storage device prior to starting of a hybrid drive for a motor vehicle;
a hydrogen storage device located on said motor vehicle;
a hydrogen-generating unit operatively connected to the fuel storage tank and to a hydrogen storage device for receiving a hydrocarbon containing fuel and generating hydrogen therefrom and prior to starting of the hybrid drive for a motor vehicle or during operation of the hybrid drive for a motor vehicle storing hydrogen in said hydrogen storage device;
a traction motor for driving said vehicle, said traction motor being coupled to receive energy from said combustion engine and from said storage means;
a fuel converter for generating hydrogen from said fuel stored in said fuel tank; and
a control device for selectively providing either hydrogen from said fuel converter, hydrogen from said hydrogen storage device or fuel from said fuel tank to operate said combustion engine;
wherein the combustion engine is configured for optional operation on fuel from said storage tank when said vehicle is in a higher driving load range, and for optional operation on hydrogen from said hydrogen-generating unit or hydrogen from said hydrogen storage device when said vehicle is in a lower driving load range.

6. The combination of claim 5 wherein said control device further controls said hybrid drive arrangement to
operate said combustion engine on said hydrocarbon containing fuel from said fuel tank during periods of higher output power requirements and optionally on hydrogen from said fuel converter or said hydrogen storage device during periods of lower output requirements, and during starting and warm-up periods for said combustion engine.

7. The combination of claim 5 wherein said control device further controls said hybrid drive arrangement to
discontinue operation of said combustion engine and operating said traction motor solely on energy from energy storage device.

8. The combination of claim 5 wherein said control device further controls said hybrid drive arrangement when said combustion engine is operated on hydrogen and a required driving power exceeds power generated by said combustion engine, to cause said energy storage device to provide energy to said traction motor.

9. The combination of claim 5 further wherein the fuel converter prior to start-up is responsive to the alternating current for converting said hydrocarbon containing fuel into hydrogen and storing the hydrogen in said hydrogen storage device.

10. The combination of claim 9 wherein said fuel converter converts and stores a sufficient quantity of hydrogen in said hydrogen storage device to at least start and warm-up said thermal engine in said vehicle.

11. The combination of claim 9 wherein said fuel converter converts and stores a sufficient quantity of hydrogen in said hydrogen storage device to enable the control device to optionally at least start and warm-up said thermal engine in said vehicle using hydrogen or stored energy whereby said thermal engine is held at a low-emission operating point.

12. The combination of claim 5 further comprising
a hydrogen fuel cell configured to receive hydrogen as an input combustible material and to produce a direct current voltage as an output, said hydrogen fuel cell being operatively connected to said hydrogen storage device located on said motor vehicle wherein a combustible material stored therein is hydrogen.

13. The combination of claim 12 wherein said control device applies said direct current voltage produced by said hydrogen fuel cell to said direct current voltage storage device or a direct current motor for driving the motor vehicle.

14. The hybrid electric vehicle of claim 13 wherein said control device enables the production of a direct current voltage from at least one of an alternating current source or said hydrogen fuel cell.

15. A method of operating a vehicle with a hybrid drive arrangement of the type having a thermal engine that can be operated with a hydrocarbon containing fuel suitable for generating hydrogen, a fuel storage tank for storing said fuel, an energy storage device in which the energy generated by the thermal engine can be stored, and a drive motor whose operating state depends on the energy from the thermal engine and/or the energy storage device, wherein the vehicle further includes:

an alternating current to energy converter for producing and storing energy in the energy storage device prior to starting of a hybrid drive for a motor vehicle;

a hydrogen storage device located on said vehicle;

a hydrogen-generating unit operatively connected to the fuel storage tank and to said hydrogen storage device for receiving hydrocarbon containing fuel and generating hydrogen therefrom and prior to starting of the hybrid drive for a vehicle or during operation of the hybrid drive for a vehicle storing hydrogen in said hydrogen storage device and wherein the thermal engine is configured for optional operation on fuel from said storage tank, hydrogen generated by said hydrogen-generating unit and stored hydrogen, said method comprising the steps of:

in a higher driving load range, operating the thermal engine on fuel from the fuel tank; and in a lower driving load range, optionally operating the thermal engine on hydrogen generated by said hydrogen-generating unit or stored hydrogen, said engine being held at a low-emission operating point.

16. A method of operating a vehicle with a hybrid drive arrangement of the type having a thermal engine that can be operated with a hydrocarbon containing fuel suitable for generating hydrogen, a fuel storage tank for storing said fuel, an energy storage device in which the energy generated by the thermal engine can be stored, and a drive motor whose operating state depends on the energy from the thermal engine and/or the energy storage device, wherein the vehicle further includes:

an alternating current to energy converter for producing and storing energy in the energy storage device prior to starting of a hybrid drive for a motor vehicle;

a hydrogen storage device located on said vehicle;

a hydrogen-generating unit operatively connected to the fuel storage tank and to said hydrogen storage device for receiving hydrocarbon containing fuel and generating hydrogen therefrom and prior to starting of the hybrid drive for a vehicle or during operation of the hybrid drive for a vehicle storing hydrogen in said hydrogen storage device and wherein the thermal engine is configured for optional operation on fuel from said storage tank, hydrogen generated by said hydrogen-generating unit and stored hydrogen, said method comprising the steps of:

during starting and warm-up, optionally operating the thermal engine on hydrogen generated by said hydrogen-generating unit generated or hydrogen stored in said hydrogen storage device, said engine being held at a low-emission operating point; and thereafter, alternatively operating the thermal engine on fuel from the storage tank and optionally hydrogen generated by the hydrogen-generating unit or stored hydrogen.

17. A hybrid drive for a motor vehicle of the type having a thermal engine that can be operated with a hydrocarbon containing fuel suitable for generating hydrogen, a fuel storage tank for storing said hydrocarbon containing fuel, an energy storage device in which the energy generated by the thermal engine can be stored, and a drive motor whose operating state depends on the energy from the thermal engine and/or the energy storage device, said hybrid drive comprising:

an alternating current to energy converter for producing and storing energy in the energy storage device prior to starting of a hybrid drive for a motor vehicle;

a hydrogen storage device located on said motor vehicle;

a hydrogen-generating unit operatively connected to the fuel storage tank and to said hydrogen storage device for receiving a hydrocarbon containing fuel and generating hydrogen therefrom and prior to starting of the hybrid drive for a motor vehicle or during operation of the hybrid drive for a motor vehicle storing hydrogen in said hydrogen storage device and wherein said thermal engine can be operated alternatively on hydrogen generated by said hydrogen-generating unit, stored hydrogen or hydrocarbon containing fuel;

said thermal engine being configured for optional operation on hydrocarbon containing fuel from said storage tank when said motor vehicle is in a higher driving load range, and for operation on hydrogen generated by said hydrogen-generating unit or stored hydrogen when said motor vehicle is in a lower driving load range.

18. The hybrid drive of claim 17 further comprising a control device for selectively apply applying both a control signal to said hydrogen-generating unit for receiving a hydrocarbon containing fuel and for generating hydrogen therefrom and prior to starting of the hybrid drive for a motor vehicle or during operation of the hybrid drive for a motor vehicle storing hydrogen in said hydrogen storage device and wherein said thermal engine can be operated alternatively on hydrogen generated by said hydrogen-generating unit, stored hydrogen or hydrocarbon containing fuel.

19. The hybrid drive of claim 17 wherein said alternating current to direct current converter includes a direct current control device for controlling the direct current characteristics of the direct current voltage and for applying said direct current voltage having said predetermined characteristics to said direct current voltage storage device.

20. A method of operating a vehicle with a hybrid drive arrangement of the type having a thermal engine that can be operated with a hydrocarbon containing fuel suitable for generating hydrogen, a hydrocarbon containing fuel storage tank for storing said hydrocarbon containing fuel, an energy storage device in which the energy generated by the thermal engine can be stored, and a drive motor whose operating state depends on the energy from the thermal engine and/or the energy storage device, wherein the vehicle further includes:

an alternating current to energy converter for producing and storing energy in the energy storage device prior to starting of a hybrid drive for a motor vehicle;

a hydrogen storage device located on said vehicle;

a hydrogen-generating unit operatively connected to the hydrocarbon containing fuel storage tank and to said hydrogen storage device for receiving hydrocarbon containing fuel and generating hydrogen therefrom and prior to starting of the hybrid drive for a vehicle or during operation of the hybrid drive for a vehicle storing hydrogen in said hydrogen storage device and wherein the thermal engine is configured for optional operation on hydrocarbon containing fuel from said hydrocarbon containing fuel storage tank, hydrogen generated by said hydrogen-generating unit or stored hydrogen, said method comprising the steps of:

in a higher driving load range, operating the thermal engine on hydrocarbon containing fuel from the fuel tank; and in a lower driving load range, and during starting and operation, optionally operating the thermal engine on hydrogen generated by said hydrogen-generating unit or stored hydrogen, said engine being held at a low-emission operating point and whereby during operating phases in which the thermal engine is operated on hydrogen, and a required driving power exceeds power generated by the thermal engine operated at the fixed operating point, an excess power requirement is supplied from said energy storage and during periods of still higher output power requirements the higher power requirement during such periods is supplied by replacing the hydrogen used for operating the thermal engine with hydrocarbon containing fuel from the fuel tank.

21. In a hybrid drive arrangement for a motor vehicle, the combination comprising:

a combustion engine which can be operated on hydrogen and on a hydrocarbon containing fuel from which hydrogen can be generated;

a fuel tank for storing hydrocarbon-containing fuel from which hydrogen can be generated;

storage device for storing energy from said combustion engine;

an alternating current to energy converter for producing and storing energy in the energy storage device prior to starting of a hybrid drive for a motor vehicle;

a hydrogen storage device located on said motor vehicle;

a hydrogen-generating unit operatively connected to the fuel storage tank and to a hydrogen storage device for receiving a hydrocarbon containing fuel and generating hydrogen therefrom and prior to starting of the hybrid drive for a motor vehicle or during operation of the hybrid drive for a motor vehicle storing hydrogen in said hydrogen storage device;

a traction motor for driving said vehicle, said traction motor being coupled to receive energy from said combustion engine and from said storage means;

a fuel-converter for generating hydrogen from said fuel stored in said fuel tank; and a control device for selectively providing hydrogen from said fuel converter, stored hydrogen or hydrocarbon-containing fuel from said fuel tank to operate said combustion engine;

wherein the combustion engine is configured for optional operation on hydrocarbon containing fuel from said storage tank when said vehicle is in a higher driving load range, and for optional operation on hydrogen from said hydrogen-generating unit or stored hydrogen when said vehicle is in a lower driving load range.

22. The combination of claim 21 wherein said control device further controls said hybrid drive arrangement to operate said combustion engine on said hydrocarbon containing fuel from said fuel tank during periods of higher output power requirements and optionally on hydrogen from said fuel converter or said stored hydrogen during periods of lower output requirements, and during starting and warm-up periods for said combustion engine.

23. The combination of claim 21 wherein said control device further controls said hybrid drive arrangement to discontinue operation of said combustion engine and operating said traction motor solely on energy from energy storage device.

24. The combination of claim 21 wherein said control device further controls said hybrid drive arrangement is operative when said combustion engine is operated on hydrogen and a required driving power exceeds power generated by said combustion engine, to cause said energy storage device to provide energy to said traction motor.

25. The combination of claim 21 further wherein the fuel converter prior to start-up is responsive to the alternating current for converting said hydrocarbon containing fuel into hydrogen and storing the hydrogen in said hydrogen storage device.

26. The combination of claim 25 wherein said fuel converter converts and stores a sufficient quantity of hydrogen in said hydrogen storage device to at least start and warm-up said thermal engine in said vehicle.

27. The combination of claim 25 wherein said fuel converter converts and stores a sufficient quantity of hydrogen in said hydrogen storage device to enable the control device to optionally at least start and warm-up said thermal engine in said vehicle using hydrogen or stored energy whereby said thermal engine is held at a low-emission operating point.

28. The combination of claim 21 further comprising a hydrogen fuel cell configured to receive hydrogen as an input combustible material and to produce a direct current voltage as an output, said hydrogen fuel cell being operatively connected to said hydrogen storage device located on said motor vehicle wherein a combustible material stored therein is hydrogen.

29. The hybrid electric vehicle of claim 28 wherein said control device enables the production of a direct current voltage from at least one of an alternating current source and said hydrogen fuel cell.

30. A method of operating a vehicle with a hybrid drive arrangement of the type having a thermal engine that can be operated with a hydrocarbon containing fuel suitable for generating hydrogen, a fuel storage tank for storing said hydrocarbon containing fuel, an energy storage device in which the energy generated by the thermal engine can be stored, and a drive motor whose operating state depends on the energy from the thermal engine and/or the energy storage device, wherein the vehicle further includes:

an alternating current to energy converter for producing and storing energy in the energy storage device prior to starting of a hybrid drive for a motor vehicle;

a hydrogen storage device located on said vehicle;

a hydrogen-generating unit operatively connected to the fuel storage tank and to said hydrogen storage device for receiving hydrocarbon containing fuel and generating hydrogen therefrom and prior to starting of the hybrid drive for a vehicle or during operation of the hybrid drive for a vehicle storing hydrogen in said hydrogen storage device and wherein the thermal engine is configured for optional operation on fuel from said storage tank, hydrogen generated by said hydrogen-generating unit or stored hydrogen, said method comprising the steps of:

in a higher driving load range, operating the thermal engine on fuel from the fuel tank; and     in a lower driving load range, optionally operating the thermal engine on hydrogen generated by said hydrogen-generating unit or stored hydrogen, said engine being held at a low-emission operating point;

during operating phases in which the thermal engine is operated on hydrogen, and a required driving power exceeds power generated by the thermal engine operated at the fixed operating point an excess power requirement is supplied from said energy storage device and during periods of still higher output power requirements the higher power requirement during such periods is supplied by replacing the hydrogen used for operating the thermal engine with hydrocarbon containing fuel from the fuel tank.

31. A method of operating a vehicle with a hybrid drive arrangement of the type having a thermal engine that can be operated with a hydrocarbon containing fuel suitable for generating hydrogen, a fuel storage tank for storing said hydrocarbon containing fuel, an energy storage device in which the energy generated by the thermal engine can be stored, and a drive motor whose operating state depends on the energy from the thermal engine and/or the energy storage device, wherein the vehicle further includes:

an alternating current to energy converter for producing and storing energy in the energy storage device prior to starting of a hybrid drive for a motor vehicle;

a hydrogen storage device located on said vehicle;

a hydrogen-generating unit operatively connected to the hydrocarbon containing fuel storage tank and to said hydrogen storage device for receiving hydrocarbon containing fuel and generating hydrogen therefrom and prior to starting of the hybrid drive for a vehicle or during operation of the hybrid drive for a vehicle storing hydrogen in said hydrogen storage device and wherein the thermal engine is configured for optional operation on fuel from said storage tank, hydrogen generated by said hydrogen-generating unit or stored hydrogen, said method comprising the steps of:

during starting and warm-up, optionally operating the thermal engine on hydrogen generated by said hydrogen-generating unit generated or stored hydrogen, said engine being held at a low-emission operating point; and     thereafter, alternatively operating the thermal engine on at least one of hydrocarbon containing fuel from the storage tank, optionally hydrogen generated by the hydrogen-generating unit or stored hydrogen.

32. A hybrid drive arrangement for a vehicle comprising an alternating current to direct current converter for producing and storing energy in an energy storage device prior to starting of a vehicle having a hybrid drive arrangement;

a fuel converter for receiving a hydrocarbon containing fuel from a hydrocarbon containing fuel in a first state from a hydrocarbon containing fuel storage device located on the vehicle and converting said hydrocarbon containing fuel into a combustible material in a second state and for storing said combustible material in a combustible material storage device located on the vehicle prior to the starting of the hybrid electric vehicle or during the operation of the hybrid electric vehicle;

a driving system for transporting the vehicle, said driving system including         a direct current motor operatively coupled to said driving system and to energy storage device, said direct current motor being responsive to a stored energy for driving said driving system in response to a first control signal;

a thermal engine operatively coupled to said driving system and to said hydrocarbon containing fuel storage device, said thermal engine being responsive to stored said hydrocarbon containing fuel for driving said driving system in response to a second control signal;

a fuel cell operatively coupled to said hydrocarbon containing fuel storage device for converting said hydrocarbon containing fuel into direct current for storing energy in an energy storage device or applying a direct current voltage for driving said direct current motor; and     a control device operatively connected to said direct current motor and to said thermal engine to selectively applying said first control signal to said direct current motor or said second control signal to said thermal engine to enable said driving system to be driven by stored energy or said hydrocarbon containing fuel.

33. The hybrid drive arrangement of claim 32 wherein said control device selectively applies both said first control signal to said direct current motor and said second control signal to said thermal engine to enable said driving system to be concurrently driven by said direct current voltage and said hydrocarbon containing fuel.

34. The hybrid electric vehicle of claim 32 further comprising a fuel converter responsive to the control device for converting the hydrocarbon containing fuel in said first state into a combustible material in said second state during operation of the vehicle.

* * * * *